UNITED STATES PATENT OFFICE.

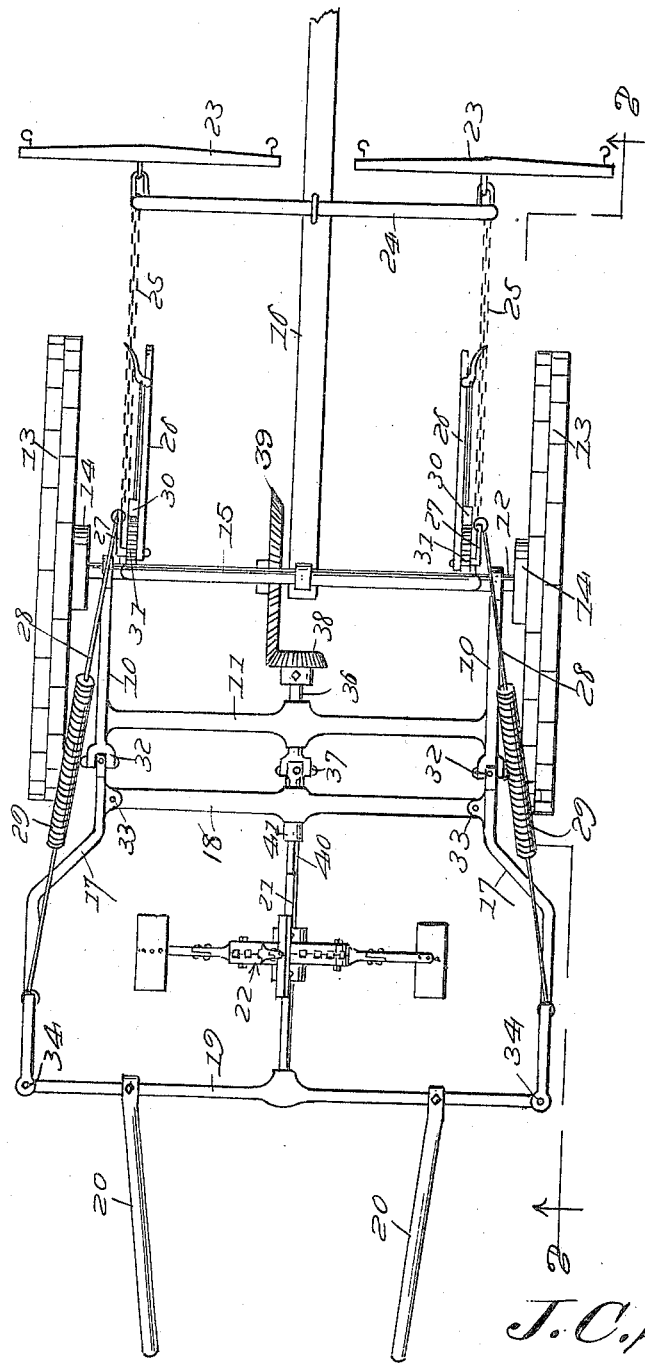

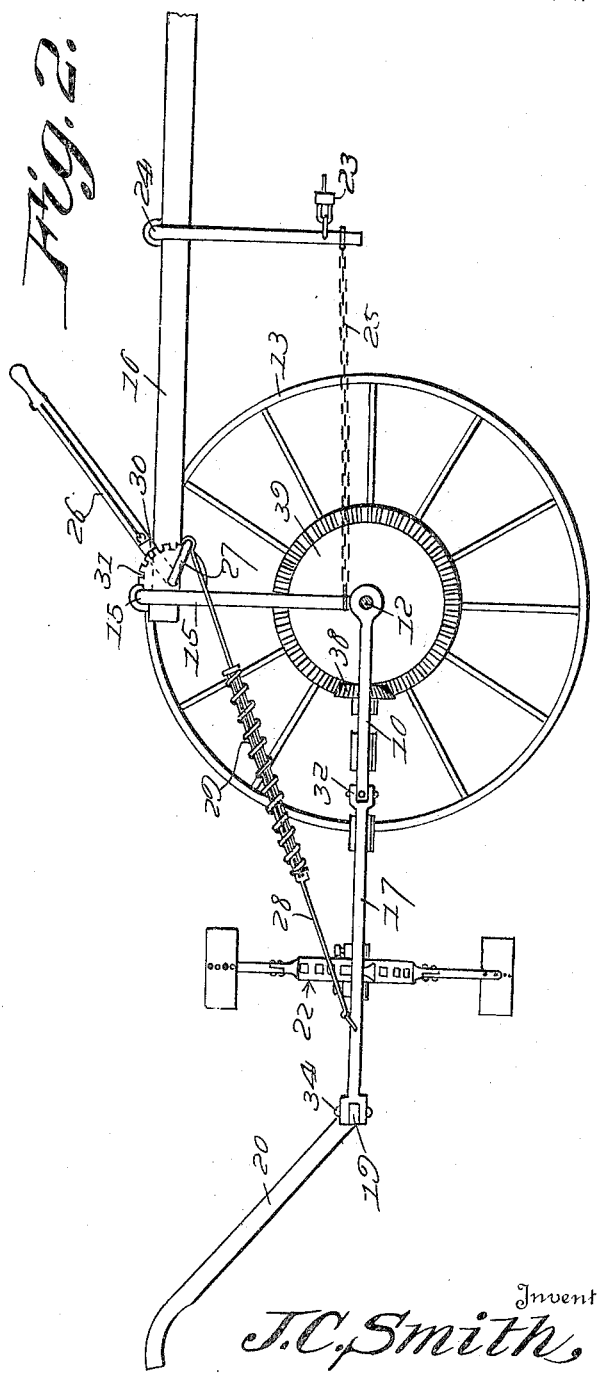

JAMES C. SMITH, OF HAVANA, ARKANSAS.

CORN AND COTTON CHOPPER.

1,390,173.   Specification of Letters Patent.   Patented Sept. 6, 1921.

Application filed February 26, 1920. Serial No. 361,456.

*To all whom it may concern:*

Be it known that I, JAMES C. SMITH, a citizen of the United States of America, residing at Havana, in the county of Yell and State of Arkansas, have invented new and useful Improvements in Corn and Cotton Choppers, of which the following is a specification.

The object of the invention is to provide a comparatively simple and efficient means for chopping or cutting out the superfluous stands of corn or cotton to leave the remaining stands at the proper intervals for development in accordance with the quality of the soil and the climatic conditions which serve to enable the grower to determine the desirable distance between hills or stands in the row, and to provide means whereby the chopping element may be readily manipulated to shift it laterally or depress it for operative engagement with the plants at the desired depth, and with these objects in view the invention consists in a construction and combination of parts of which a preferred embodiment is shown in the accompanying drawings, wherein:

Figure 1 is a plan view of the machine.

Fig. 2 is a side view of the same.

The apparatus consists essentially of a supporting frame having side bars 10, a cross bar 11 and an axle 12 upon which are mounted the ground wheels 13 connected with the axle by suitable clutch mechanisms 14, an arch 15 rising from the axle, and a draft tongue 16 connected with said yoke or arch; and a relatively movable trailer or chopper frame connected with and drawn by the main frame and consisting of the side bars 17, the transverse brace 18, the rear cross bar 19 and handles 20 adapted for use in guiding the trailer frame, the chopper shaft 21 being mounted in a longitudinal position upon the trailer frame and carrying the chopper wheel 22.

The draft appliances may consist of single or double trees 23 mounted upon a yoke 24 supported by the tongue 16, the arms of the latter being connected by draft chains 25 with the main frame at points on the arch 15 adjacent to the plane of the axle while mounted on the arch substantially in the vertical plane of each of the side bars 10 of the main frame is a hand lever 26 having a crank arm 27 connected by a rod 28 with the chopper frame, said rod being cushioned by means of a spring 29. The hand lever preferably carries a dog 30 traversing a toothed segment 31 to provide for locking the same and hence the chopper frame at the desired adjustment.

The members of the chopper frame are universally jointed at 32 to the main frame to provide for lateral and vertical swinging movement of the former, the transverse brace 18 being pivotally connected with the side bars of the chopper frame as shown at 33 and corresponding pivotal connections 34 being provided between the extremities of the rear cross bar 19 and the said members of the chopper frame to the end that by means of the handle 20 the operator following the machine may move the chopper frame sidewise to insure the proper action of the chopper blades 35 upon the rows of plants.

The chopper shaft 21 receives motion from a driven shaft 36 mounted on the main frame through a universal coupler 37, said driven shaft receiving motion through a pinion 38 with which meshes a gear 39 carried by the axle 12. Also in order that the lateral movement of the chopper frame may not interfere with the communication of rotary motion from the driven shaft 36 to the chopper wheel, the shaft 21 is preferably of extensible construction, having its terminal 40 fitted in a sleeve 41 to compensate for the lateral or sidewise movements of the trailer frame.

The relative diameters of the gears 38 and 39 obviously will determine the movement of the chopper wheel relative to the distance traveled by the ground wheels.

When the machine is not in actual use or is being transported from one point of use to another the chopper frame may be elevated by means of the levers 26, and when the chopper frame is in its operative position it may be depressed by the operator through the medium of the handles 20 and in opposition to the cushioning effect of the springs 29 to cause the chopper blades to operate at the desired depth, while at the same time the chopper wheel may be caused to operate in the desired path by the lateral or sidewise swinging of the frame controlled in the same way by the operator.

What is claimed is:

1. A machine for the purpose indicated having a main frame provided with ground wheels and draft means, a chopper frame disposed in trailing position to the main frame and comprising spaced side bars each of which has a universal connection with the main frame, forward and rear transverse bars pivotally connected to the side bars of the chopper frame, handles carried by the rear transverse bar, a chopper wheel, a longitudinal shaft supported by the transverse bars of the chopper frame and carrying the chopper wheel, means for communicating motion from the ground wheel to the longitudinal shaft, and means for raising and lowering the chopper frame relative to the ground, the said means offering no interference to the depression of the frame by the handle elements or its swinging laterally to one side or the other.

2. A machine for the purpose indicated comprising a main frame having ground wheels, and a chopper frame disposed in trailing position with reference to the main frame, the said chopper frame comprising spaced side bars each universally connected at its forward end to the rear of the main frame, transverse forward and rear bars spanning the side bars of the chopper frame and pivotally connected to the latter, a chopper wheel, a chopper shaft rotatably mounted in bearings in the said side bars and composed of sections by means of which it becomes extensible, means for communicating motion from the ground wheels to the said shaft, and handles carried by the rear transverse bar of the chopper frame, whereby lateral movement may be imparted to the latter for the purpose specified.

3. A machine for the purpose indicated comprising a main frame provided with ground wheels, a chopper frame in trailing position with relation to the main frame and comprising spaced side rails universally connected at their forward ends to the main frame, forward and rear transverse bars spanning the said side rails and pivotally connected to the latter, a chopper wheel carried by the chopper frame, means for communicating motion from the ground wheels to the chopper wheel, handle bars carried by the rear transverse bar of the chopper frame, latch controlled hand levers and associated toothed segments mounted on opposite sides of the main frame, the said levers being provided with crank arms, connecting rods connecting said arms with the side rails of the chopper frame, and cushioning springs interposed in said connecting rods, whereby the chopper frame may be elevated and lowered with respect to the ground and yet be subject to depression by the handle bars or moved laterally by the latter.

In testimony whereof I affix my signature.

JAMES C. SMITH.